United States Patent [19]
Van Vechten et al.

[11] Patent Number: 5,593,744
[45] Date of Patent: Jan. 14, 1997

[54] HOLLOW REINFORCING MEMBERS AND COMPOSITES CONTAINING THE SAME

[75] Inventors: James A. Van Vechten; James R. Lundy; Alan K. Wallace; Chris A. Bell, all of Corvallis, Oreg.

[73] Assignee: Oregon Reinforcement Engineering, Ltd., Corvallis, Oreg.

[21] Appl. No.: 333,485

[22] Filed: Nov. 2, 1994

Related U.S. Application Data

[63] Continuation-in-part of Ser. No. 163,084, Dec. 6, 1993.
[51] Int. Cl.[6] ................................................. B29D 23/00
[52] U.S. Cl. ................... 428/34.4; 428/36.92; 138/174; 138/175; 138/129; 138/121; 138/172; 138/103; 52/740.1; 52/740.5; 52/730.2
[58] Field of Search ........................ 428/34.1, 34.4, 428/36.92, 36.91, 36.9; 138/174, 175, 129, 121, 172, 103; 52/737, 740, 720, 726.1, 728

[56] References Cited

U.S. PATENT DOCUMENTS 4,627,212  12/1986  Yee ............................................. 52/726

*Primary Examiner*—James J. Seidleck
*Assistant Examiner*—Michael A. Williamson
*Attorney, Agent, or Firm*—Chernoff, Vilhauer, McClung & Stenzel

[57] ABSTRACT

There is disclosed a hollow reinforcing element for casting into composites, which in use defines passageways that may communicate to the exterior of the composite and that can serve as conduit arrays in structures formed from the composite. Benefits include superior strength to weight ratios, reduced thermal stresses, suppression of crack propagation, and improved corrosion protection. The hollow reinforcing elements may also be used to provide antennae, drain systems, leveling devices, containment structures and pneumatic levitation of vehicles.

13 Claims, 16 Drawing Sheets

5,593,744

HOLLOW REINFORCING MEMBERS AND COMPOSITES CONTAINING THE SAME

This is a continuation-in-part of application Ser. No. 08/163,084 filed Dec. 6, 1993, now pending.

BACKGROUND OF THE INVENTION

This invention relates to cast structures, such as pavements, foundations, floors, ceilings, containments, doors, railway ties, roofs, skylights, walls, and to reinforcement and maintenance of the same.

Many composite materials are made of two components: a continuous phase component and a reinforcing component. The continuous phase component is typically a cast material such as asphalt, cement, concrete, ceramic, or glass, or combinations thereof. These materials have good compressive strength, but typically lack flexural and tensile strength. The reinforcing component is a strong material having good tensile strength, such as graphite fiber, polyamide fiber, or steel. Common examples of such composites in civil structures are steel-reinforced concrete and asphalt or concrete reinforced with polymeric grids or weaves.

The primary purpose of reinforcing components is to enhance the capability of a composite to withstand tensile and flexural stresses, particularly after cracks have formed in the continuous phase component. Some prior art composites have included random length and randomly oriented hollow fibers as reinforcing members. For example, pyrolytic graphite fibers having a lumens a few nanometers in diameter have been used to reinforce ceramics and plastics. Straw, which has little tensile or flexural strength, and has a lumens about 2 mm in diameter, has been used to make ceramic bricks and has been mixed into cement for many years. Such hollow reinforcement materials have proved to be useful, but have no utility beyond adding dimensional stability or limited tensile strength to the composite materials in which they are used.

Conduits have been cast into continuous phase materials. For example, thin-walled heating conduit has been cast into pavements for the purpose of deicing. However, such pavement usually also contains solid steel rebar to provide tensile strength. The heat pipe is quite flexible and thus does not provide significant flexural or tensile strength reinforcement. Smooth-walled conduit has also been cast into concrete structures to receive electrical wiring. The smooth outer surface texture of such pipe and conduit does not permit mechanical interlock with the surrounding concrete, and so provides negligible tensile and flexural reinforcement to the concrete.

There is also a procedure for concrete reinforcement that is known as "post tensioning." According to this procedure, very thin-walled (less than 2 mm) conduits having only slightly greater tensile and flexural strength than concrete are cast into concrete structures and cables run through the conduits. After the concrete has cured, the cables are tensioned and a grout injected to mechanically interlock the cable to the composite. This imparts a compressive stress to the composite to oppose tensile stresses that develop in service.

While all of the above-mentioned technologies are highly useful, they do not make the most efficient use of materials for the reinforcement of cast structures.

SUMMARY OF THE INVENTION

There are several aspects of the present invention. In its most fundamental aspect, there is provided a hollow structural element for tensile and flexural strength reinforcement of a body of cast material. In a closely related aspect, there is provided a composite comprising a body of cast material having cast therein the hollow structural reinforcing element. When at least some of the hollow structural reinforcing elements extend to the exterior of the cast material, fluids can be contained within or passed through the composite via the interior of the structural elements, and antennae, sensors or other electronic devices can be readily placed and replaced within the composite.

DETAILED DESCRIPTION OF PREFERRED EMBODIMENTS

Figure 1A:
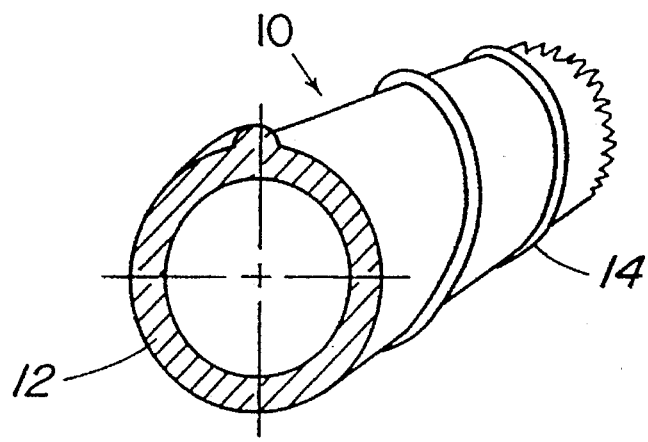
FIGS. 1a, 1b and 1c are schematic perspective, plan and cross-sectional views, respectively, of an exemplary hollow structural reinforcing element of the present invention.

The present invention provides a number of benefits over prior art cast structures. These include the following:

Hollow members used for reinforcement have an increased tensile strength-to-weight ratio compared to solid reinforcement. The tensile strength along the axis of a reinforcing member is determined by the minimum cross-sectional area of the reinforcing material. This is true both for the hollow structural reinforcing elements of the present invention and for solid rebar. Thus, hollow elements will have the same tensile strength as rebar if the cross-sectional areas of the reinforcing materials are the same and if the materials are of the same composition. However, with the hollow structural reinforcing element of the present invention, the hollow region is less dense than the surrounding body of concrete or other hard material. Thus the ratio of strength to weight is increased for a given volume of composite material.

Hollow structural reinforcing elements according to the present invention provide a mechanism for controlling the temperature within a composite cast structure during curing. As a result, it is possible to obtain an improvement in the adhesion between the hollow member and the surrounding cast material. Because many cast materials, particularly ceramic and glass, have much smaller coefficients of thermal expansion than do the materials of reinforcing members, it is beneficial to hold the temperature spatially and temporally uniform during curing. This can readily be accomplished by circulating temperature-controlled fluids through the hollow reinforcing members and/or through manifolds connecting the members. This has not been accomplished in the past, partly because a hard material typically emits heat at variable rates as it sets. In the case of concrete, the coefficient of thermal expansion varies with the exact composition from about 50% to about 120% of that for steel rebar. Also, the emission of heat from concrete as it cures is composition-dependent. Because it is critical for the reinforcement function to keep the cast material such as concrete stressed in compression, it is highly desirable that curing take place at the highest temperature the material will experience in service.

A particular advantage is the capability to circulate fluids through the cast structure, such as pavement, while it is in service. The temperature of a fluid can be adjusted to minimize thermal stresses, which can cause cracking of concrete and other cast materials.

Composite cast structures according to the present invention can benefit from the capability to inject a fluid which inhibits corrosion of hollow structural reinforcing elements made of metal. It is common for steel rebar to corrode when chloride ions, for example from salt, diffuses through reinforced concrete to the vicinity of the steel and converts the environment of the steel from alkaline to acidic. This causes conversion of the oxide on the surface of the rebar from wuestite (FeO) to hematite ($Fe_2O_3$), which results in swelling of the oxide layer on the rebar, which in turn causes local failure of concrete and loss of bond with the reinforcement. Attempts have been made to retard this chloride ion attack by cathodic protection, but there are reports that cathodic protection leads to accumulation of sodium ion around the steel, which also degrades the bond. When the hollow structural reinforcing members are provided with holes on their outer surfaces, alkaline solutions, such as ammonium hydroxide, can be passed through the members to flush both chloride and sodium ions away from the steel and thus maintain an alkaline environment.

The hollow reinforcing elements of the present invention also provide the advantage of a built-in system of conduits that may be useful for many purposes. In addition to their reinforcement function, such conduits can be used to place and replace sensors and antenna in pavement for use in monitoring and controlling traffic and to exchange information with passing vehicles. The conduits can be used to circulate a fluid to de-ice the structure or to collect solar thermal energy. Cables extending through the conduits can communicate power or information through the composite structure. The conduits can be used to collect water for drainage. Fire fighting chemicals can be delivered through the conduits. A liquid or gas can be passed through the conduits to flush a surface of the composite structure.

Figure 1B:
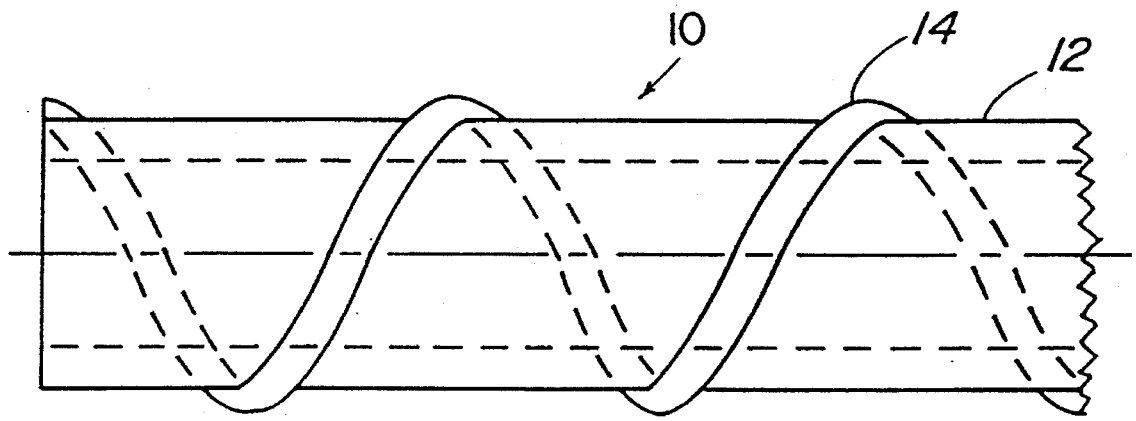
Figure 1C:
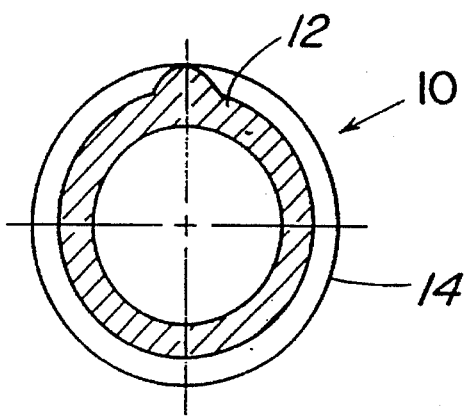
Figure 2A:
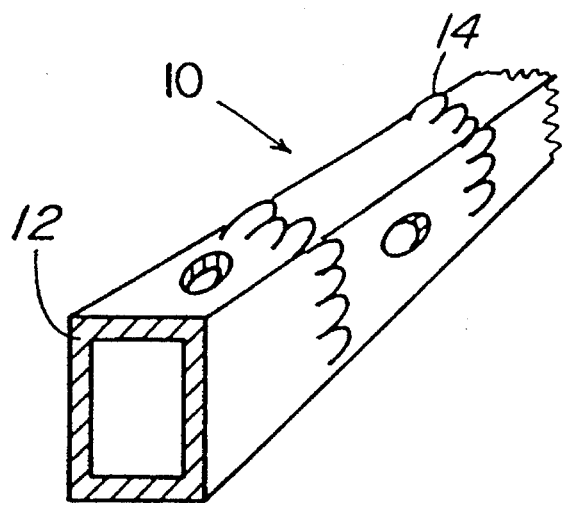
FIGS. 2a, 2b and 2c are schematic perspective, plan and cross-sectional views, respectively, of another exemplary hollow structural reinforcing element of the present invention.
Figure 2B:
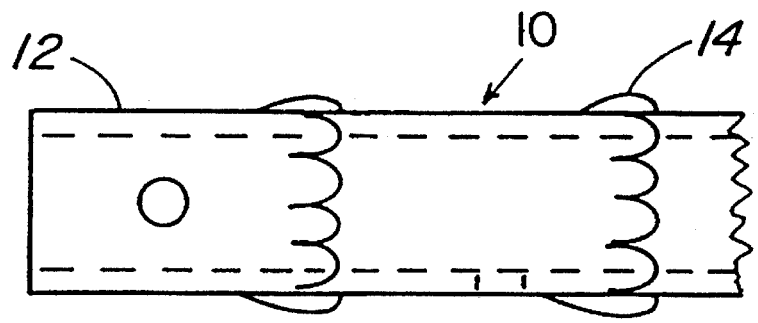
Figure 2C:
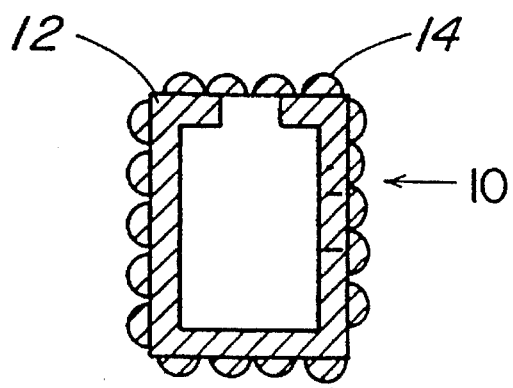

Referring to the drawings, wherein like numerals designate the same element, FIGS. 1a–1c depict an exemplary simple form of the basic hollow reinforcing element 10 for tensile and flexural strength reinforcement of a body of cast material. The reinforcing element 10 comprises a substantially tubular rigid member 12 having an interior diameter (ID) greater than 4 mm, an outer diameter (OD) not greater than 50 mm, a wall thickness (t) of 1 mm or at least 10% of the ID, whichever is greater, and an outer surface having an array of ridges 14 substantially perpendicular to and integral with the exterior of the tubular member. The hollow reinforcing element 10 has a tensile strength of 10 megaPascals (MPa) or four times that of material being reinforced, whichever is greater. The shape of the ridges 14 may be in the form of a ring surrounding the tubular rigid member 12, a protrusion on the exterior thereof, or a substantially continuous spiral around the exterior thereof. The last-mentioned form is depicted in FIGS. 1a–1c.

In a preferred embodiment, and to meet current American Association of State Highway and Transportation Officials (AASHTO) specifications (as set forth in AASHTO Designation M 31M-90), the ridges 14 have a height h, and a width w, at least about 10% of the OD but which need not be more than 4 mm, with spacing d, equal to no more than the OD of the reinforcing element 10 and oriented substantially perpendicularly to the axis so as to oppose the expected loads along the same. It is generally advantageous that the height of the ridges exceed this minimum. In steel rebar, these ridges are known as "deformations" and are formed typically by hot rolling strand cast steel. The production of the hollow reinforcing elements of the present invention may be accomplished (1) by welding wires or ribbons of steel around the exterior of steel pipes, (2) by epoxy bonding short sections of plastic pipe on the outer surface of smooth plastic pipe, (3) by manufacturing from polymers and polymer/fiber composites by forcing either a metallic spiral or suitably configured ridged metallic network through a die, together with the material, in processes known as co-extrusion or co-pultrusion, (4) by machining ridges into pipe, (5) by wrapping ridged sheets around a mandrel and butt welding or bonding the same to the hollow reinforcing element, and (6) by wrapping sheets of expanded metal around a mandrel and butt welding or bonding the same to the hollow reinforcing element.

Although cross-linked polymer fibers and composites of the same are desirable for inclusion in composites that are used to fabricate the hollow reinforcing elements of the present invention, an especially preferred class of fibers is that of carbon fibers, especially those derived from polyacrylonitrile (PAN) and pitch, due to their high strength, high modulus and low cost. PAN-derived carbon fibers use copolymers of ≧85% PAN as a starting material, which is spun into fibers, then oxidized at 200°–300° C., carbonized at 1000°–2500° C. in an inert atmosphere, then surface treated and sized. See, for example, Wightman et al., "Carbon Fibers: Property of Testing and Analysis" in Lee, 1 *International Encyclopedia of Composites* 226 (1990) and Peebles, 39 *Int. Materials Rev.* 75 (1994). Such PAN-derived carbon fibers are commercially available from a number of sources, including AKZO ("Fortafil" fibers), Amoco ("T" series fibers), BASF ("Celion" fibers), Hercules ("Magnamite" fibers) and Toray Industries ("Torayca" fibers). To obtain high strength and modulus, pitch-derived carbon fibers are preferably formed from coal tar and petroleum pitch which has first been partially transformed into a liquid crystal-like structure called "mesophase," which is then spun into fibers and heat-treated, etc. in substantially the same manner as PAN-derived carbon fibers.

Figure 6:
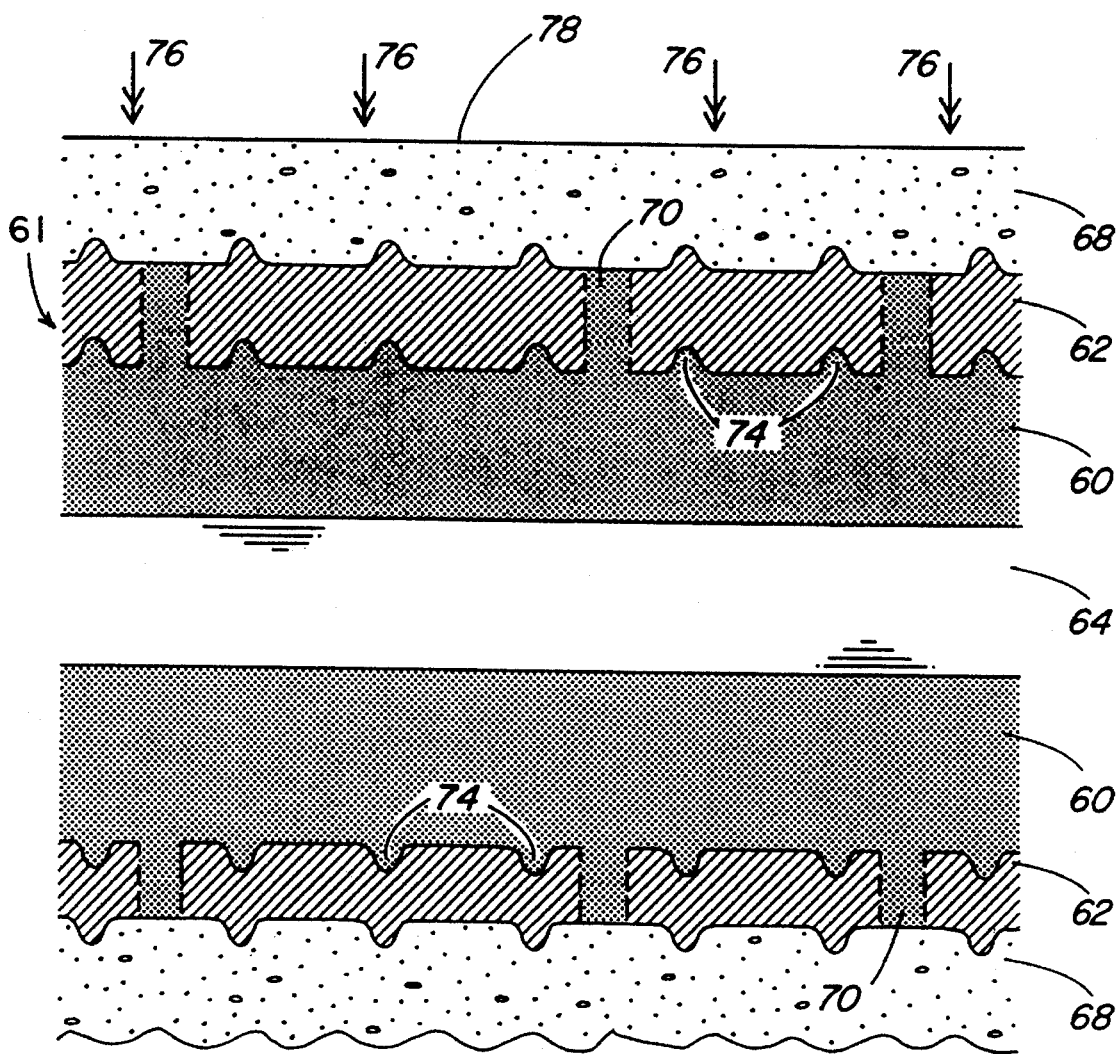
FIG. 6 is a schematic cross-sectional view of a two-component hollow reinforcing element in a cast material.

The hollow reinforcing element must effectively reinforce the whole of the composite structure and must not deform and separate from the cast material under the stresses encountered in service. When any reinforcing member is stressed in tension along its axis, it inevitably contracts in the dimensions perpendicular to that axis. Thus, the bond between, e.g., steel rebar and concrete, is placed in tension when the rebar is stretched. Concrete, cement, ceramics, glass and similar hard materials cannot withstand tensile stresses nearly as well as compressive stresses. To meet this requirement, in the simple case of a hollow reinforcing element composed of a single material, e.g., steel, the reinforcing element should have a wall thickness, t, not less than 10% of the ID or 1 mm, whichever is greater. However, with the present invention it is possible to combine within the reinforcing element the tough material (such as steel) used in the prior art for the reinforcing element with the same cast material as in the remainder of the composite or with a different cast material, such as Portland cement or the material known as macrodefect-free cement. See, for example, Tan et al., "Advanced Materials from Hydraulic Cements," A 322 *Phil Trans. R. Soc. Lond.*, 479 (1987). Thus, referring to FIG. 6, a hollow reinforcing element 62 may be filled, in whole or in part, with cement 60 and the combination 61 may be used as a reinforcing element with or without a passageway 64. FIG. 6 depicts such a partially filled hollow reinforcing element 61 cast in a continuous phase substrate 78. Alternatively, the Portland cement or macrodefect-free cement core 60 may first be cast with ridges 74 and then a metal or cross-linked polymeric component may be wrapped and bonded about this core 60 or deposited onto it. For example, high quality iron may be deposited onto cement at temperatures around 200° C. by chemical vapor deposition using iron pentacarbonyl $(Fe(CO)_5)$ as a source in the manner set forth in R. Kaplan et al., 41 *Appl. Phys. Lett.*, 972 (1982). Alternatively, iron and other metals may be deposited on cement by electrodeless deposition from appropriate solution. With the two-component reinforcing element 61 illustrated in FIG. 6, the tendency of the reinforcing element to reduce its diameter when stretched transmits a compressive stress to the cast material of the core 60, which is well suited to withstand it.

Such a two-component reinforcing element offers the advantage of reducing the quantity of ferromagnetic material required to give a prescribed degree of tensile and flexural strength reinforcement. This feature would be useful in the case of a reinforcing element of the guideway for a magnetically levitated train where there is concern that the train's electromagnetic field will impart drag to the train and stress the reinforcement and thus tend to break up the composite. In addition, corrosion-producing oscillating currents within the reinforcing member may be relieved by the introduction of periodic perforations 70, as shown in FIG. 6.

Figure 7:
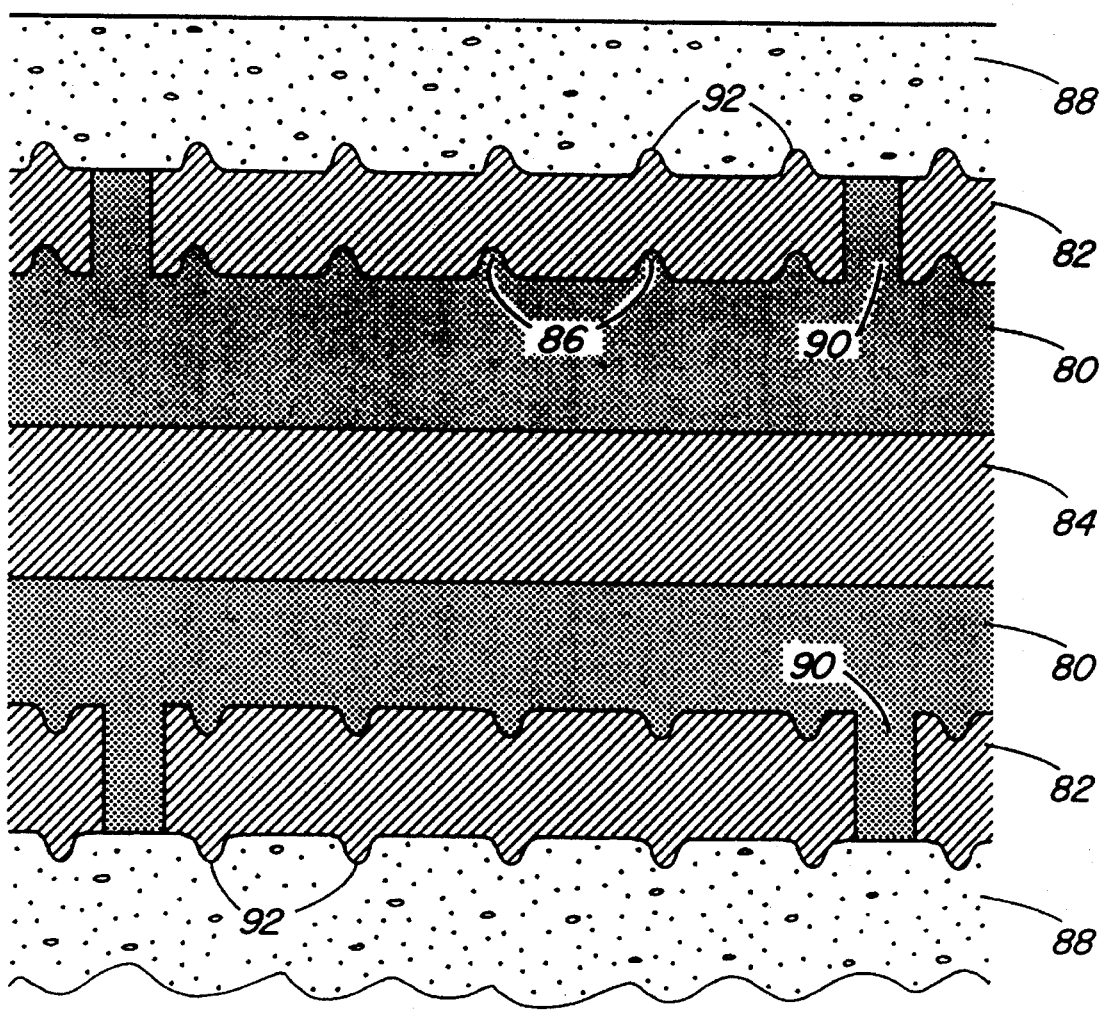
FIG. 7 is a schematic longitudinal cross-sectional view of a "leaky coaxial cable" hollow reinforcing element in a cast material.

Such a two-component reinforcing element also offers the opportunity to form a combination of a coaxial cable and a reinforcing member as illustrated in FIG. 7 by providing a metallic layer on both the interior and exterior surfaces of the cement core. In the case that perforations 90 are provided in the outer metallic layer, a reinforcing member with the properties of an antenna such as a "leaky coaxial cable" results. Such antennae have potential application for intelligent vehicle highway systems, to provide communication between vehicles and the roadway.

Ordinary intact (non-leaky) coaxial cables are widely used to conduct electronic signals because they emit and receive very little noise. The laws of physics known as Maxwell's Equations show that a single conductor carrying a non-steady electric current will radiate electromagnetic energy (also known as radio waves). However, they also show that two coaxial conductors carrying the same non-steady current in opposite directions will emit no electromagnetic energy outside the outer conductor. Thus, if a signal is induced between two coaxial conductors, electric and magnetic fields will be induced between the two conductors and electromagnetic energy will be confined in the insulating space between them, but no radiation will be emitted outside the pair. In this way electronic signals are conducted from one end of the coaxial cable to another without unwanted emission of electromagnetic radiation, also known as noise, to the environment. It is also known that ambient electromagnetic radiation will not only induce a current in a single conductor, but it will induce the same current in each of a coaxial pair of equivalent conductivity. Thus, no signal will be induced by ambient electromagnetic radiation between the two conductors of common coaxial cables, which have matched conductors. This is an example of the Reciprocal Principle of electromagnetic (and optical) systems; they emit and receive radiation with equal efficiency and they cannot receive what they cannot emit and vice-versa.

If holes are cut in the outer conductor of a coaxial cable, then any impressed current must detour around the holes and electromagnetic energy in the insulator between the two conductors will "leak" out the holes. Thus, such a pair of conductors is said to be a leaky coaxial cable. The holes in the outer conductor will act very much like dipole antennae and can be made to produce a reasonably efficient and directional system to both emit and receive electromagnetic signals.

The U.S. Department of Transportation and several states are using leaky coaxial cables as antennae (i.e., ordinary coaxial cables which have had an array of holes cut into their outer conductor on one side) to identify moving vehicles, and to a lesser extent to communicate with them. The cables are embedded in the pavement with the holes oriented upwardly. Transponders are mounted on the underside of the vehicles to be identified; these respond to the signal they receive from the leaky coaxial cable with an identification signal. These are often combined with weigh in motion and toll collection systems. In order to communicate, a receiver is added to the transponder on the bottom of the vehicle. In advanced programs, particularly in Germany, moving vehicles are actively controlled by signals from the embedded cables so that they can safely run close together at high speeds. By convention, U.S. systems generally operate at 915 MHz, which utilizes a 33 cm wave length (in free space), and is denoted as microwave radiation.

Currently, leaky coaxial cables are installed by cutting trenches in the pavement, and then inserting the cables in the trench, often with a plastic pipe and thermoplastic packing material around them. In many cases these installations have not held up well in service. Studded snow tires are particularly damaging. With the present invention, such cables may be installed inside non-conducting hollow reinforcing elements (made perhaps of macrodefect-free cement) or the hollow reinforcing element itself may be fabricated as a leaky coaxial cable.

EXAMPLE 1

Figure 3:
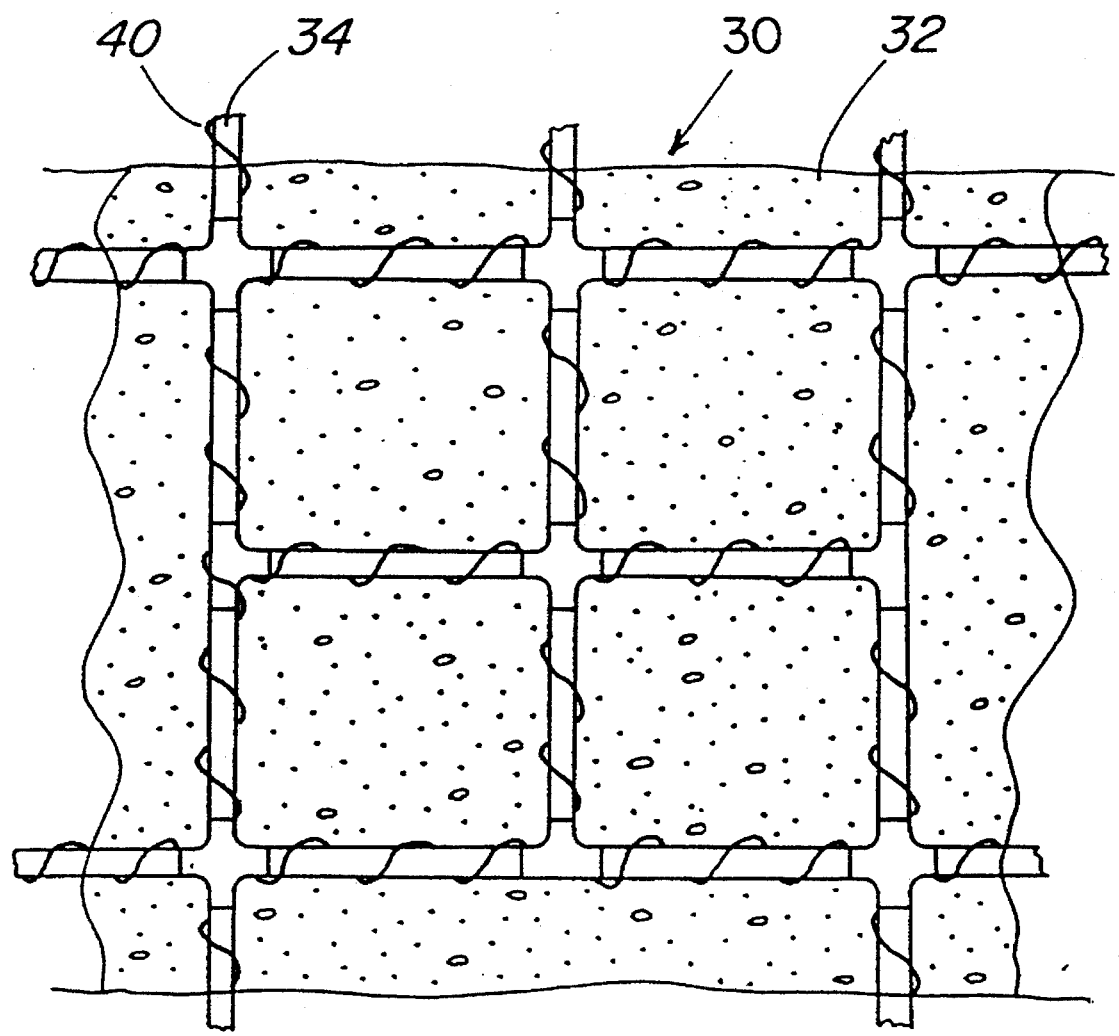
FIG. 3 is a schematic plan view of an exemplary array of the hollow structural reinforcing elements of the present invention in communication with a series of common manifolds.
Figure 4:
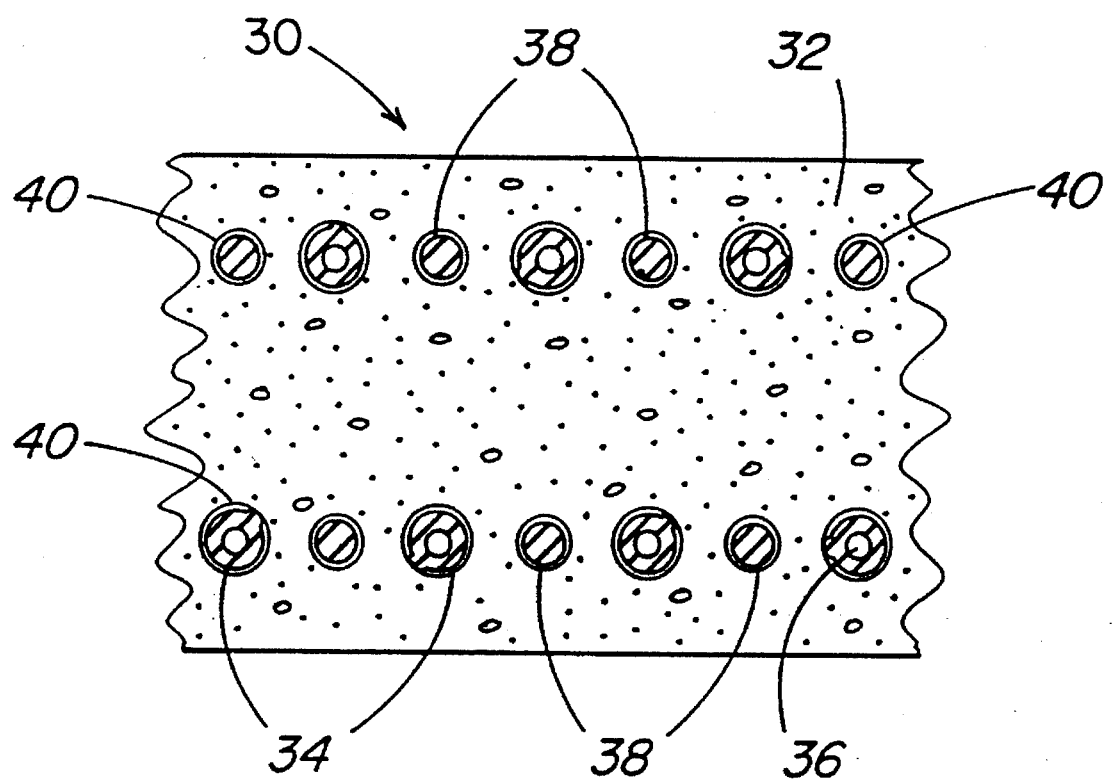
FIG. 4 is a schematic cross-sectional view of a composite of cast material with both solid rebar and hollow reinforcing elements of the present invention.
Figure 5:
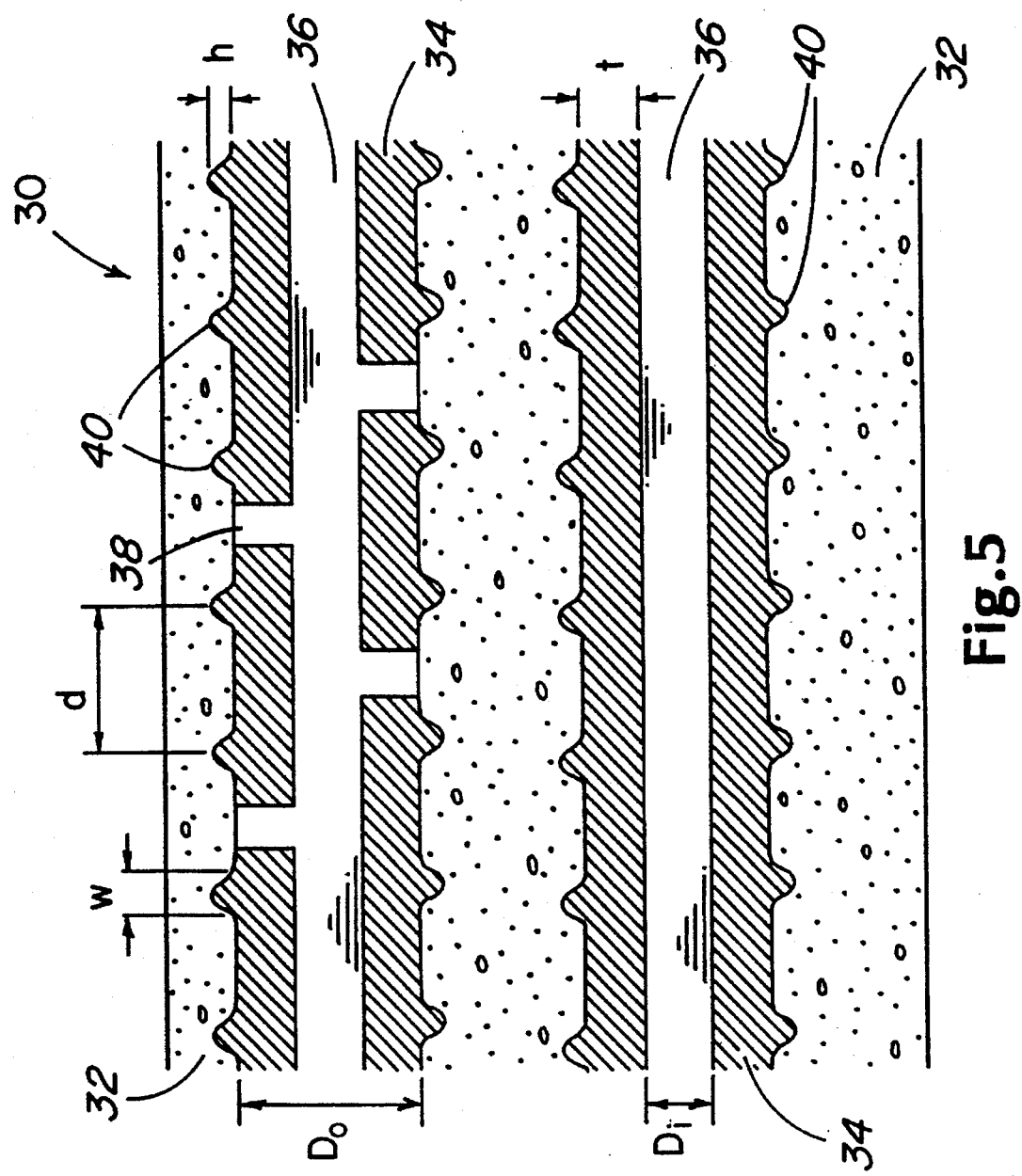
FIG. 5 is a schematic longitudinal cross-sectional view of cast material reinforced with the hollow reinforcing elements of the present invention.

A basic embodiment of the invention is illustrated in FIGS. 3 and 4, which depict a reinforced structure 30 comprising a body of cast material 32 containing either multiple hollow reinforcement elements 34 interlocked in a grid (FIG. 3) or a combination of multiple solid reinforcement bars 38 and multiple hollow reinforcement elements 34 (FIG. 4). As is the case with conventional rebar, the surface between the hollow reinforcing element 34 and the remainder of the composite is textured with ridges or deformations 40 so that the reinforcing elements 34 and the cast material 32 interlock mechanically. The cross section of the reinforcing member may be round, square, rectangular, triangular or otherwise polygonal.

EXAMPLE 2

Another embodiment of the invention is a two-component reinforcing element 61 as illustrated in FIG. 6 with an array of holes 70 in the surface of the metallic component 62, which are designed to reduce the interaction between the magnetic field 76 of a magnetically levitated train and a guideway structure 78 reinforced with such two-component reinforcing elements. The reinforcing element consists of an inner core 60 of macrovoid-free cement and an outer layer 62 of steel as illustrated in cross section in FIG. 6. The array of holes 70 in the surface of the metallic component are designed to interrupt the eddy currents that otherwise would be induced by the magnetic levitation system of passing trains.

EXAMPLE 3

Another embodiment of the invention is a combination "leaky coaxial cable" antenna and reinforcing element embedded in a composite structure, illustrated in FIG. 7. The "leaky coaxial cable" consists of an inner conductor 84 of copper or aluminum surrounded by an electric insulating medium 80, which in turn is surrounded by an outer conductor or metallic sheath 82. Sheath 82 is keyed to the insulator 80 by notches 86. Sheath 82 also has periodic perforations 90 that allow the coaxial cable to "leak" electromagnetic energy. The whole reinforcing element/cable mechanically interlocks with the outer cast material 88 by ridges 92. Thus, reinforcement of the cast material 88 is provided by notches 86, ridges 92, insulating medium 80 and, to a lesser extent, electric conductor 84. Insulating medium 80 may comprise microdefect-free cement, which would provide additional reinforcement.

EXAMPLE 4

Figure 8:
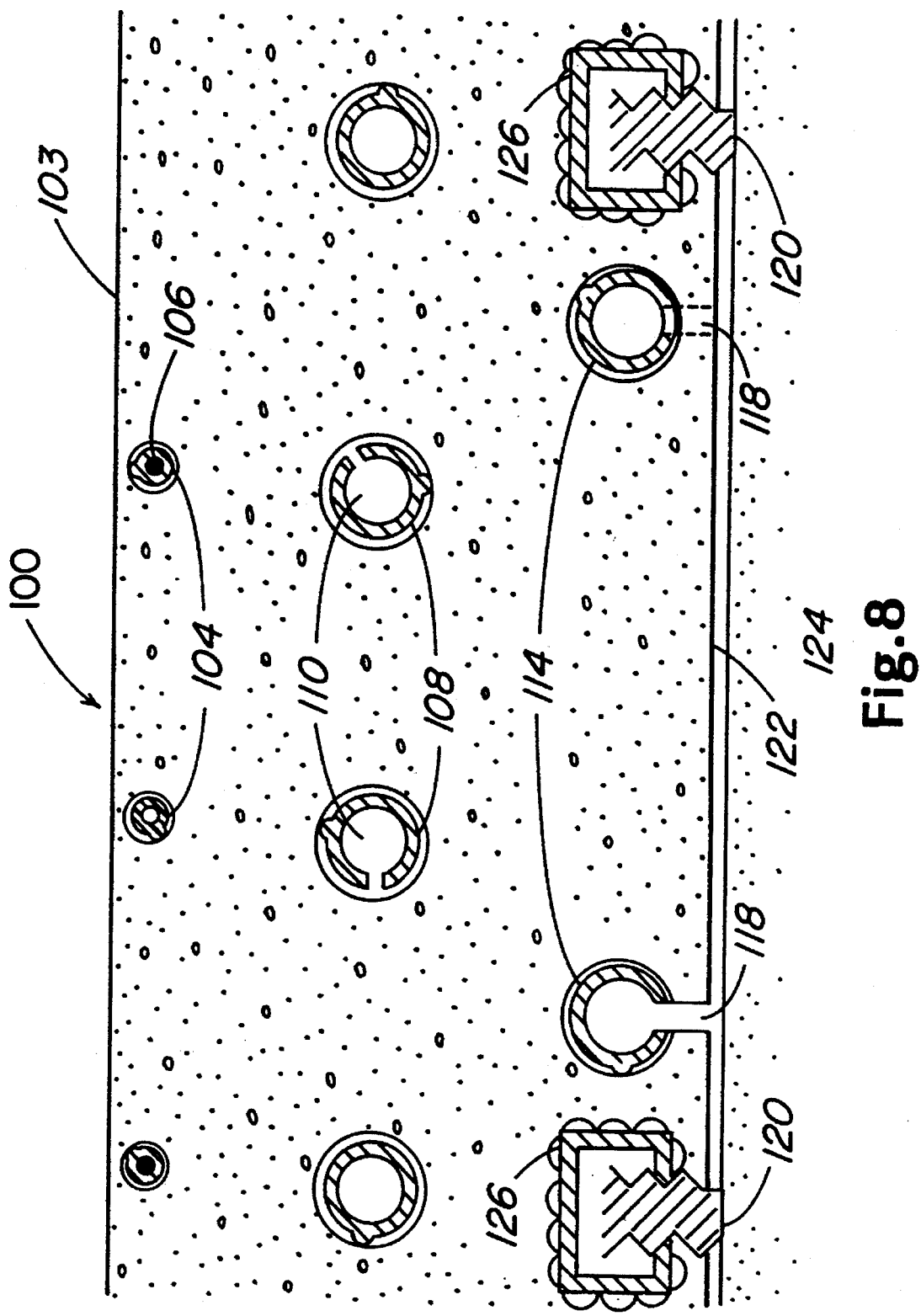
FIG. 8 is a schematic cross-sectional view of a section of "smart pavement" reinforced with the hollow structural elements of the present invention.

Another embodiment of the invention, as illustrated in FIG. 8, is a prefabricated, reinforced concrete pavement section 100 equipped with devices inside the hollow reinforcing elements 104, 108, 114 and 126, all of said elements being cast in a body of cast material 103. Such devices could include electronic devices 106 near the surface of the concrete to detect, communicate with or control motor vehicles; devices or heated fluids to adjust temperatures during curing of the concrete or in service; chemical solutions to inhibit corrosion of the reinforcing members within the pavement; and devices 120 to adjust the support of the pavement pneumatically or mechanically. Such a pavement product is designed to meet the prospective need for "smart highways" that are capable of interacting with vehicles for purposes of monitoring and control using electronic devices that are contained in the uppermost reinforcing members 104, which may be constructed of nonmetallic material 104, such as polymers or polymer composites. A preferred composite includes carbon fibers, and especially those derived from PAN and pitch. Rather than cutting holes or slots in the solid pavement for insertion of electronic devices and then patching with suitable filler, the present invention allows insertion of electronic devices from the side of the roadway into the tube of a hollow reinforcing element. Replacement of such devices may be effected in the same way without any need to obstruct traffic. Excess and redundant capacity may be built in to provide for future needs and replacements. The embodiment illustrated in FIG. 8 is also equipped with hollow steel reinforcing elements 108 in the central region. Fluids such as air, water, alkaline aqueous solutions such as ammonium hydroxide solution, or ethylene glycol or other antifreeze solutions may be passed through hollow spaces 110 of elements 108 to achieve several benefits. These benefits include reduction of the thermal gradients between the inside and the outside of the material and across the slab, which are major causes of pavement cracking and warping. Alkaline solution can be injected into the concrete in the vicinity of the reinforcing metal to inhibit the corrosion, which occurs when chloride ion infiltration causes the concrete to become acidic. For this purpose, holes are provided in the walls of the reinforcing members. The flow of heated fluids can also be used to de-ice the pavement and other fluids may be used to collect solar thermal energy. Hollow steel reinforcing elements 114 near bottom surfaces 122 of the pavement section may be provided with selectively openable projecting vents 118 extending to the bottom surface 122, allowing for adjustment of the support of the section by the injection of, for example, air, dust, grout or mud under the section. The injection of air provides partial or total pneumatic support for the pavement section to ease its installation, leveling, and removal. The injection of dust, grout, mud and the like is particularly useful for the filling of voids that may form under the section. However, the formation of such voids will be greatly reduced relative to current technology if central reinforcement members 110 are used to minimize temperature variations and thus to minimize thermal gradients induced during curing. The reason this is so is because concrete expands or contracts in response to temperature changes relative to a baseline that is defined as the concrete setting temperature. The concrete member curls when the temperature of the surface is different than the temperature of the bottom. Curled members are not fully supported and therefore are subjected to higher stresses than fully supported slabs. A reduction in the temperature gradient will reduce the member stress and therefore prolong life. Also, deicing the pavement will minimize freezing of the base, subbase, and subgrade layers. Thus, the potential for freeze- and thaw-induced heave of pavements is reduced. Currently pavement is normally cast in place, requiring the roadway to be closed to traffic for a considerable time while the pavement is poured and allowed to cure. Quick-setting concrete mixtures are often used to reduce the delay but cost or quality may be compromised. Normal concretes require typically 28 days to achieve 90% of their ultimate strength. Rapid setting concretes require approximately one to seven days to reach 90% of their ultimate strength. It is common practice to cure conventional concrete for 7 to 14 days before it is placed in use for supporting motor vehicle traffic. Pre-cast slabs cured in accordance with the present invention could be constructed off site and promptly shipped to the road rehabilitation site for installation, reducing road closure times to a matter of hours. Electronic devices 106 may be installed and tested at a remote prefabrication site. Devices to circulate fluids through the hollow reinforcing elements can be connected at the side of the roadway with minimal interference with vehicular traffic. The same is true for the connection of the electronics and the bottom-filling members 114. Expansion/contraction joints and load transfer devices can be provided on the sides of each section which will mate with other sections. The bottom surface 122 of each section may be shaped at the prefabrication site in accordance with known techniques to mate with the surface of the application site 124. The pavement section is also adjustable by the use of jacks 120 mounted in an array at the bottom of the section. The jacks 120 fit into hollow reinforcing elements 126 and may be adjusted by means conducted through the hollow member from the side. These means may be hydraulic, piezoelectric, or a mechanical screw that is turned mechanically or by hydraulic or piezoelectric means. When such adjustments are made with the jack system, projecting vents 118 may be used to inject or remove material from under the pavement. In order to restrain lateral movement of the various pavement sections, the jacks may rest on, screw into, or be soldered or welded to mounting plates installed on the surface beneath.

EXAMPLE 5

Figure 9:
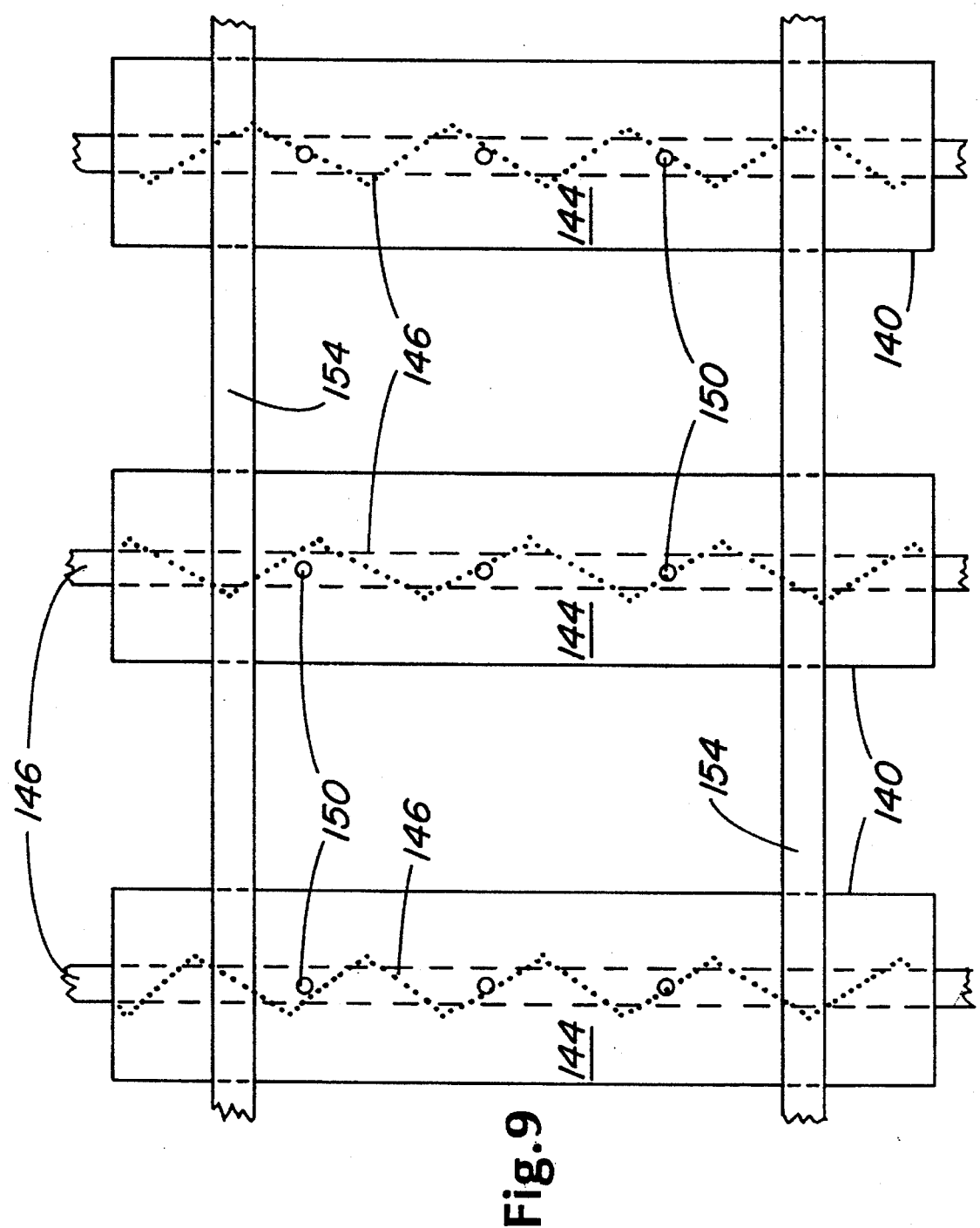
FIG. 9 is a schematic plan view of cast railroad ties reinforced with the hollow structural elements of the present invention for a railway pneumatic levitation system.

Another embodiment of the invention, as illustrated in FIG. 9, is a concrete railroad tie 140 reinforced with a hollow reinforcing elements 146 that are equipped with an array of projecting vents 150 extending to the upper surface 144 of the tie. Pressurized air can be forced through hollow elements 146 and projecting vents 150 so that air is directed to the underside of passing railroad cars so that they are at least partially levitated. With this system the rails 154 are used to guide the railroad cars in conventional fashion, but, by virtue of the pneumatic levitation, the weight of the train is dispersed more broadly over the railroad bed. Also, the advantages of reduced rolling friction and smoother ride that have been promised by existing magnetic levitation systems are obtained with more conventional rolling stock and guideways.

EXAMPLE 6

Figure 10:
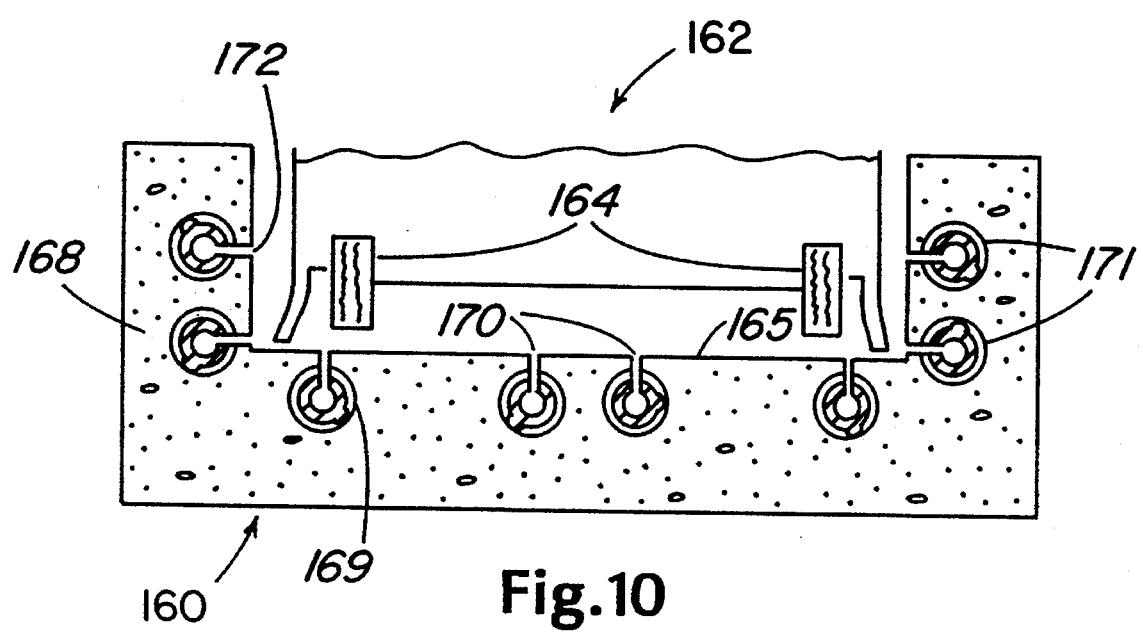
FIG. 10 is a schematic plan view of a cast guideway, for the pneumatic levitation of automobiles and trucks, reinforced with the hollow structural elements of the present invention to facilitate levitation.
Figure 11:
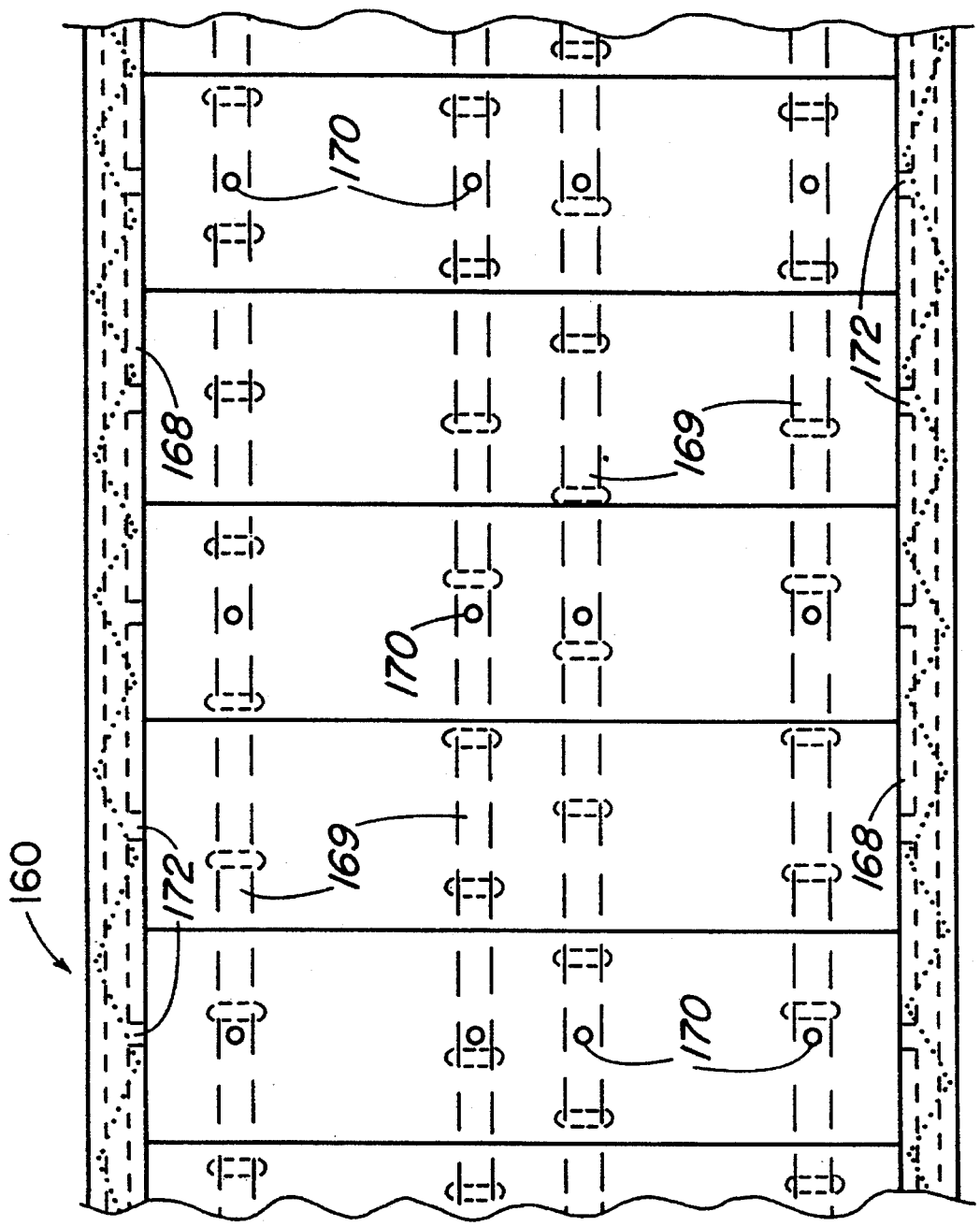
FIG. 11 is a schematic aerial view of the cast guideway of FIG. 10.

Another embodiment of the invention, as illustrated in FIGS. 10 and 11, is a combined pavement and guideway 160 reinforced with an array of hollow reinforcing elements 169 that are equipped with projecting vents 170 and 172 extending to the upper and side surfaces of the pavement/guideway. Air which is directed to the underside of passing vehicles 162 results in at least partial levitation of the same from the pavement; benefits include reduction of the wear on the pavement surface 165 and reduction of the rolling friction within passing vehicles. An optional, and theoretical addition to the pavement is the inclusion of side walls to the pavement to effectively provide a guideway that restricts vehicular traffic by confining it to a single lane. Pneumatic vent arrays 172 are provided in the side wall of the guideway 168 by hollow reinforcing elements 171 at the edges of each lane to maintain vehicles properly aligned in their respective lanes through curves and when subjected to cross winds.

EXAMPLE 7

Figure 12:
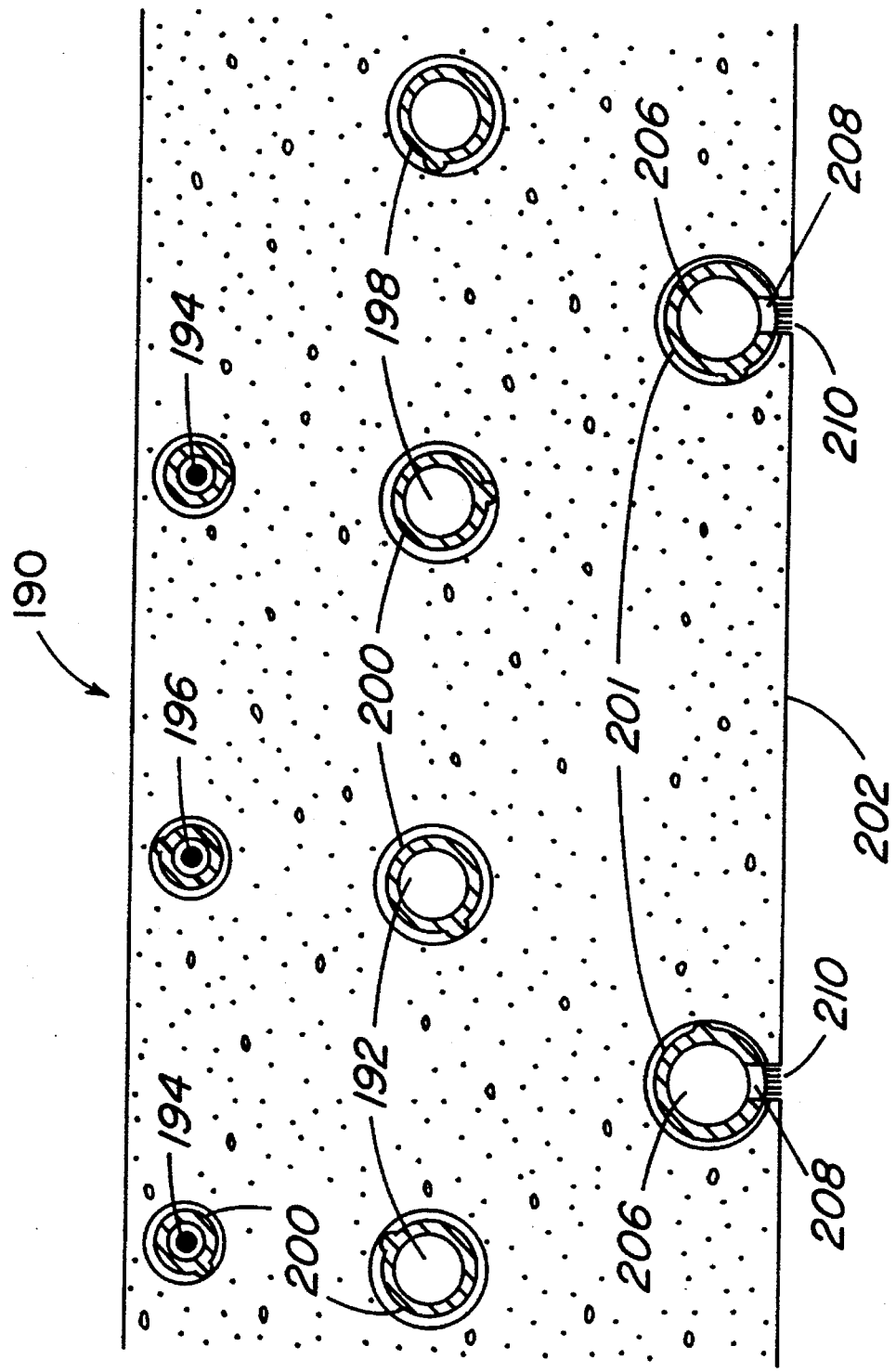
FIG. 12 is a schematic cross-sectional view of a cast ceiling section reinforced with She hollow structural elements of the present invention.

Another embodiment of the present invention is a cast ceiling section 190, illustrated in FIG. 12. It is envisioned that the ceiling section can be fabricated off site and then transported to the building site where it may be installed. Water 192, air 198, electric power 194, pressurized fire retarding fluid 206, and communication links 196 may be installed at the fabrication site in the hollow spaces of in the reinforcing elements 200 and 201. Hollow members 201 in the lower surface 202 of the cast ceiling section may be provided with projecting vents or nozzles 208 which are sealed by plugs 210 that melt or rupture to release pressurized fire retardant fluid 206.

EXAMPLE 8

Figure 13:
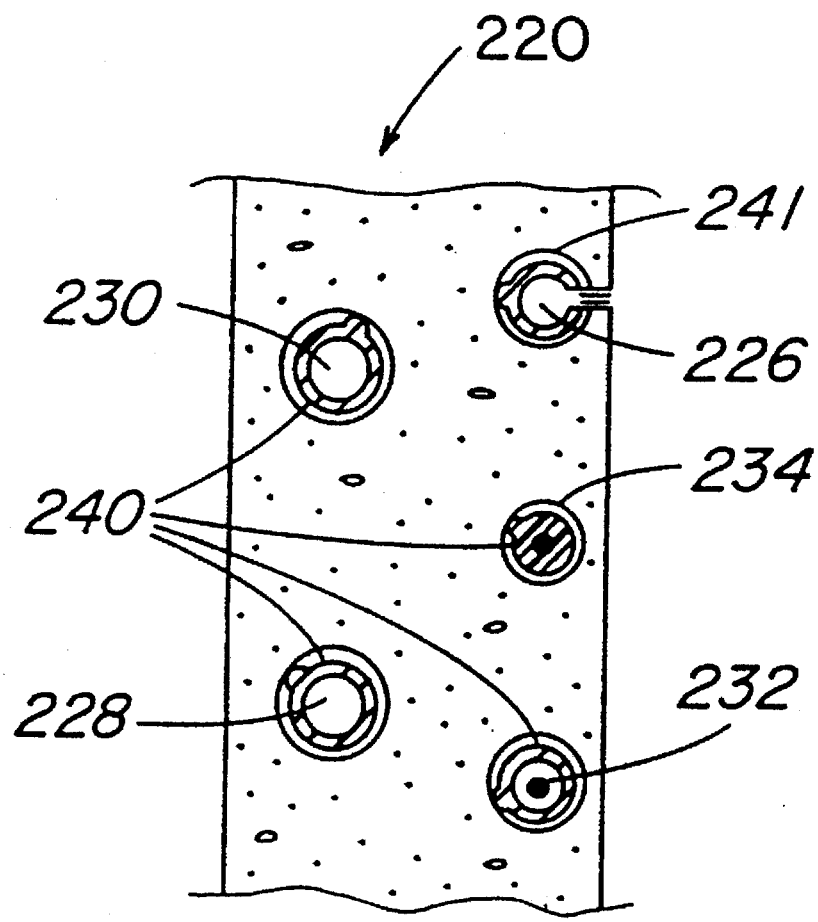
FIG. 13 is a schematic cross-sectional view of a cast wall reinforced with the hollow structural elements of the present invention.

Another embodiment of the present invention is a cast wall section 220 of a building, illustrated in FIG. 13, which may also be fabricated off site and then installed. Water 228, air 230, electric power 232, pressurized fire prevention fluid 226, and communication links 234 may be installed at the fabrication site in the hollow spaces of 240 and 241 of the reinforcing elements. These links may be connected to adjoining sections of the building as the sections are mated at the installation site.

EXAMPLE 9

Figure 14:
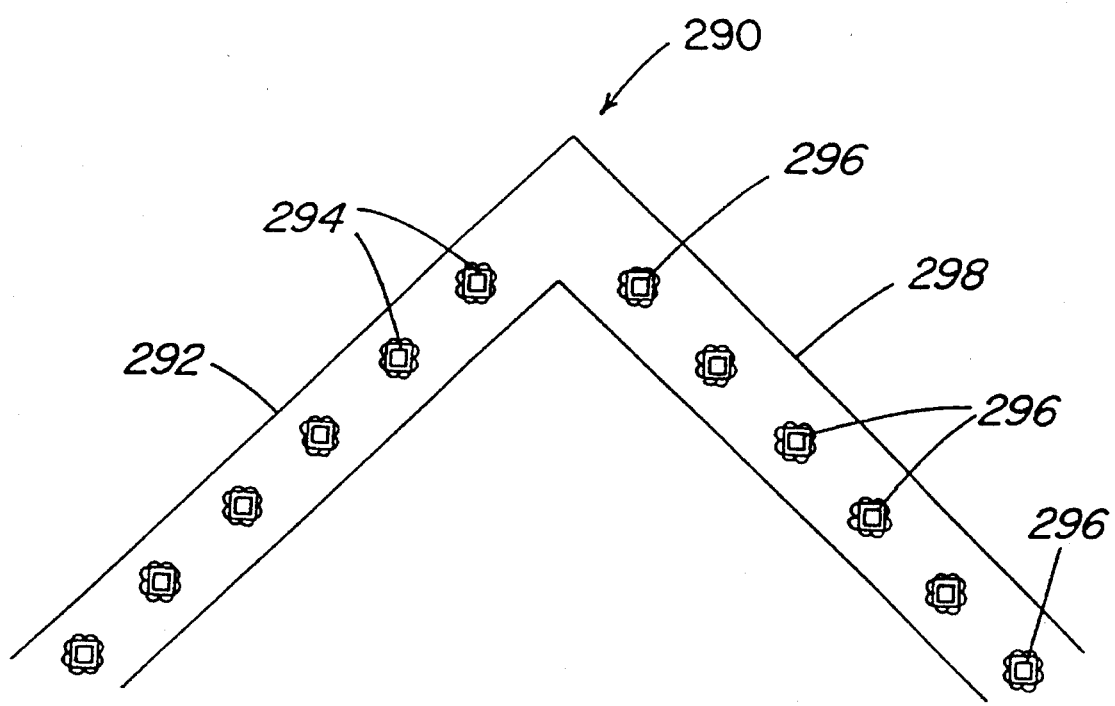
FIG. 14 is a schematic cross-sectional view of a cast roof system reinforced with the hollow structural elements of the present invention.

Another embodiment of the present invention is a cast composite roof system 290, illustrated in FIG. 14. Here hollow reinforcing elements 296 in the truss falling on the side 298 of the roof section facing the sun at noon (south side in the northern hemisphere) may be used as solar thermal collectors by circulating a fluid such as air, water or oil to provide for space heating, domestic hot water or to aid in cooling the building by removing heat with the circulated fluid. The hollow reinforcing elements 294 in the truss falling on the side 292 facing away from the sun at noon (north side in the northern hemisphere) may be used to dissipate excess heat by radiation. To facilitate such heating and/or cooling, conventional solar thermal absorber material may be applied to the outer surface of the roof on the south side or a conventional black body radiator material may be applied to the exterior surface of the roof on the north side.

EXAMPLE 10

Figure 15:
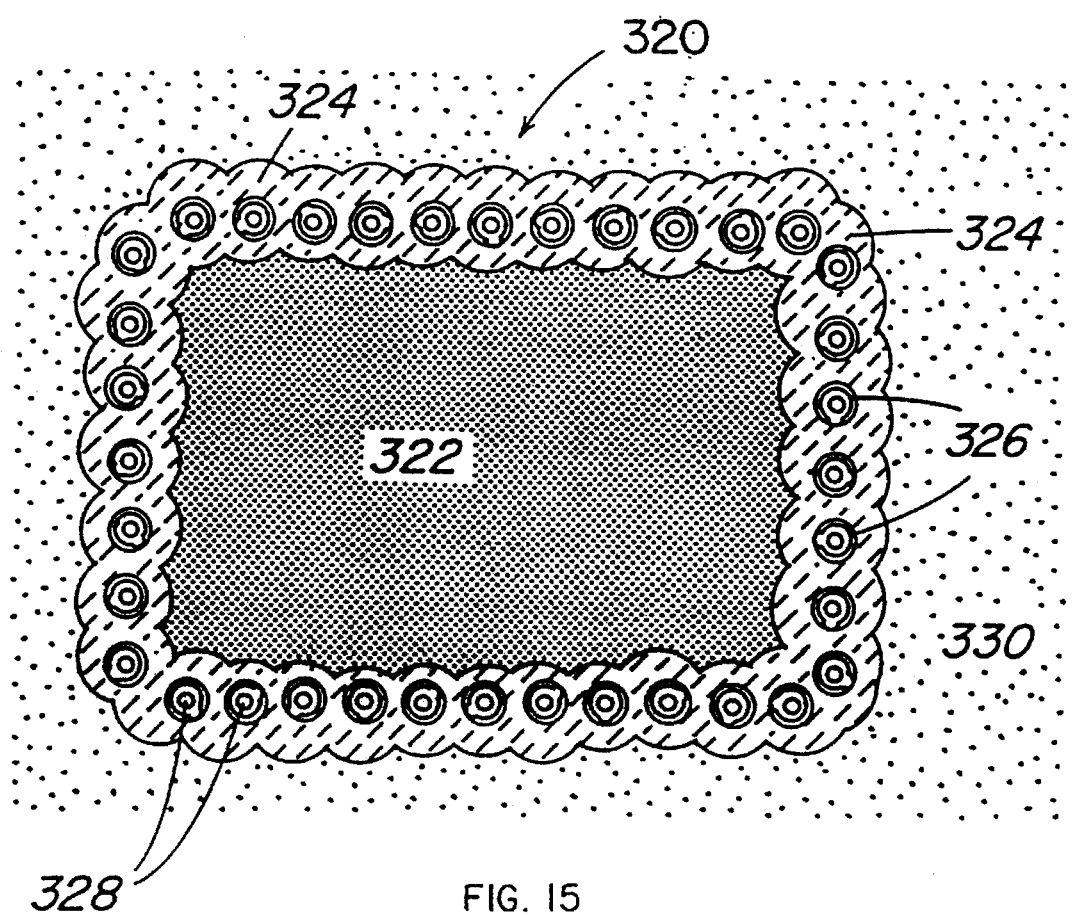
FIG. 15 is a schematic cross-sectional plan view of an in situ cast containment structure reinforced with the hollow structural elements of the present invention, which may be used for hazardous waste containment.

Another embodiment of the present invention is a hollow element-reinforced containment 320, e.g., for hazardous waste, formed by in situ vitrification facilitated by heat injected via the hollow reinforcing elements, illustrated in FIG. 15. Currently, in situ vitrification containment of hazardous waste involves heating soil surrounding the hazardous waste, and perhaps some contaminated soil, hot enough that the soil fuses, then resolidifies as a glass or fused ceramic upon cooling. This process is workable if the soil contains sufficient glass-forming materials, such as silicate sand. The heat may be introduced via electromagnetic waves, sometimes referred to as "microwave heating" although the wave lengths used may be longer than the "microwave" portion of the spectrum. With the present invention, hollow reinforcing elements 326 are first driven or drilled to sufficient depth, e.g., to bed rock, around the perimeter of the intended containment 320. Then heat is introduced by passing heated fluids, such as the gases 328 of combustion of fuel oil or natural gas, or by heated air from electric or Nichrome heaters, through the hollow elements 326 which are constructed of a material having a melting temperature greater than the glass transition temperature of the soil in question, thus allowing the hollow reinforcing elements to remain solid while the surrounding soil 330 becomes a vitrified composite 324. In some cases practical containment will require that the reinforcement and the vitrification run under the hazardous waste as well as around it. This can be accomplished by angle drilling from the side or by inserting the hollow reinforcing elements in successive sections from the side of a trench around the perimeter either before or after vitrification of the perimeter wall. In addition to facilitating the injection of sufficient heat to vitrify soil to form the containment (without heating the overlaying hazardous waste excessively), the present invention offers other benefits with regard to the avoidance of cracks in the containment structure. Avoidance of cracks is critical to maintenance of the integrity of the containment. By flowing a fluid through the heated body, one can reduce the magnitude of the thermal gradient greatly. This is a critical advantage for the avoidance of crack formation during the solidification process. Large bodies of glass or ceramic tend to crack during solidification because the outside cools faster than the inside. The outer portion then becomes stressed in tension due to the thermal contraction. The coefficient of thermal expansion of steel and similar materials that may be used for the hollow reinforcing elements is generally greater than that of glasses and ceramics. As the temperature of the glass or ceramic portion of the body passes below the glass transition temperature, viscous flow in that material ceases. As the body cools further, the hard glass or ceramic material is stressed in compression while the reinforcing elements are stressed in tension. The compressive stress imparted to the hard glass or ceramic material suppresses the tendency to form cracks still further. Even if cracks do form in the hard glass or ceramic material, as a result of earthquakes or any other cause, the hollow reinforcement elements prevent cracks from propagating and prevents the hard material on the two sides of a crack from moving with respect to each other. One may also use the hollow reinforcing elements to reheat the hard material allowing it to reflow and then to heal cracks as it resolidifies again. This process can be repeated as many times as necessary during the duration of the containment.

Figure 16:
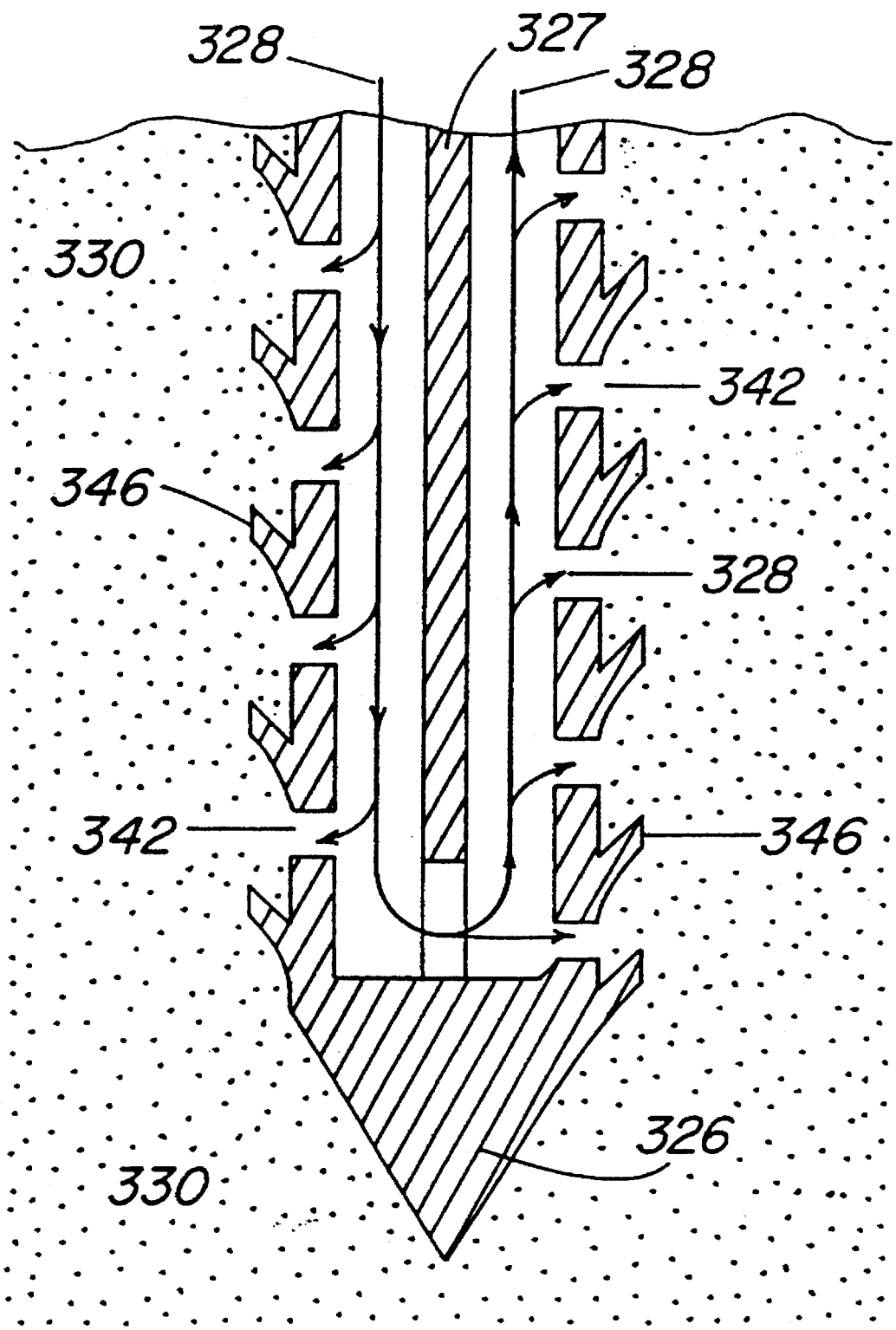
FIG. 16 is a schematic diagram of a hollow reinforcing structural elements of the present invention, in the form of a drill, which may be used in the construction of an in situ cast containment structures by means of heat injected via holes in the walls of the hollow reinforcing element.

FIG. 16 illustrates another embodiment of the invention adapted for use in the above-mentioned containment application. It is a hollow drill/reinforcing element 326 with holes 342 in its sidewalls, a multiplicity of which may be drilled into the soil 330 to be vitrified. The ridges 346 on the sides of the element 326 are in a spiral array so that they serve both the auguring function of the drill and the mechanical interlock function of the reinforcing element. In this case, the hot gases 328 of combustion are forced out the holes in the sidewalls of the hollow drill/reinforcing element into the soil to facilitate the injection of heat. A baffle 327 extending down the hollow interior of the drill reinforcing element from the shaft end nearly but not entirely to the tip end allows hot gases to be forced down one side and then back up the other, thus effecting nearly uniform temperatures along the length of the drill/reinforcing elements.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A composite comprising a body of cast material having cast therein a plurality of structural elements that provide tensile and flexural strength reinforcement to said body of cast material, each of said structural elements comprising a substantially tubular rigid member that, following casting of said body of cast material, has an unobstructed lumen for containment of a fluid or an electrical or optical component and having an interior diameter greater than 4 mm but not greater than 50 mm, a wall thickness of 1 mm or at least 10% of the interior diameter, whichever is greater, a ridged outer surface engaging said body of cast material exterior to said structural elements, and a tensile strength of at least 10 megaPascals or four times the tensile strength of the material being reinforced, whichever is greater.

2. The composite of claim 1 wherein said body of cast material is at least one member selected from the group consisting of asphalt, concrete, macrodefect-free cement, ceramic, fiberglass, carbon fiber composites and glass.

3. The composite of claim 1 wherein said structural elements are formed from at least one material selected from the group consisting of metal, steel, cross-linked polymer, carbon fibers and composites thereof, a layered composite of macrodefect-free cement and iron, a layered composite of Portland cement and carbon fibers, a layered composite of macrodefect-free cement and carbon fibers, a layered composite of Portland cement and cross-linked polymer, and a layered composite of macrodefect-free cement and cross-linked polymer.

4. The composite of claim 1 wherein at least some of said structural elements extend to the exterior of said body of cast material.

5. The composite of claim 1 wherein at least some of said structural elements are in communication with a common manifold.

6. The composite of claim 4 wherein said body of cast material is selected from the group consisting of asphalt and concrete and wherein those structural elements that extend to the exterior of said body of cast material contain within their respective interiors at least one component selected from the group consisting of an antenna, an electrical wire, a coaxial cable, an optical fiber, an electronic device, and a heating element.

7. The composite of claim 4 wherein said body of cast material is selected from the group consisting of asphalt and concrete and wherein those structural elements that extend to the exterior of said body of cast material contain within their respective interiors a fluid.

8. The composite of claim 4 wherein said body of cast material is selected from the group consisting of asphalt and concrete and wherein at least some of said structural elements are provided with nozzles oriented toward and in communication with the exterior of the upper surface of said body of cast material.

9. The composite of claim 4 wherein said body of cast material is selected from the group consisting of asphalt and concrete containing holes in the upper surface thereof which are in communication with the interior of those structural elements that extend to the exterior of said body of cast material.

10. A composite comprising a body of cast material selected from the group consisting of asphalt, concrete, macrodefect-free cement, ceramic, fiberglass, carbon fiber composites and glass, said body of cast material having cast therein a plurality of structural elements that provide tensile and flexural strength reinforcement to said body of cast material, at least some of which structural elements extend to the exterior of said body of cast material, each of said structural elements comprising a substantially tubular rigid member having an interior diameter greater than 4 mm but not greater than 50 mm, a wall thickness of 1 mm or at least 10% of the interior diameter, whichever is greater, a ridged outer surface engaging said body of cast material exterior to said structural elements, and a tensile strength of at least 10 megaPascals or four times the tensile strength of the material being reinforced, whichever is greater, and wherein those structural elements that extend to the exterior of said body of cast material contain within their respective interiors a fluid.

11. The composite of claim 10 wherein said fluid is heated and circulated.

12. The composite of claim 10 wherein said fluid is a solution which inhibits corrosion of metal.

13. A composite comprising a body of cast material selected from the group consisting of asphalt, concrete, macrodefect-free cement, ceramic, fiberglass, carbon fiber composites and glass, said body of cast material having cast therein a plurality of structural elements that provide tensile and flexural strength reinforcement to said body of cast material, at least some of which structural elements extend to the exterior of said body of cast material, each of said structural elements comprising a substantially tubular rigid member having an interior diameter greater than 4 mm but not greater than 50 mm, a wall thickness of 1 mm or at least 10% of the interior diameter, whichever is greater, a ridged outer surface engaging said body of cast material exterior to said structural elements, and a tensile strength of at least 10 megaPascals or four times the tensile strength of the material being reinforced, whichever is greater, and wherein those structural elements that extend to the exterior of said body of cast material contain within their respective interiors at least one component selected from the group consisting of an antenna, an electrical wire, a coaxial cable, an optical fiber, an electronic device, and a heating element.

* * * * *

UNITED STATES PATENT AND TRADEMARK OFFICE
CERTIFICATE OF CORRECTION

PATENT NO. : 5,593,744

DATED : January 14, 1997

INVENTOR(S) : VanVechten, Lundy, Wallace and Bell

It is certified that error appears in the above-indentified patent and that said Letters Patent is hereby corrected as shown below:

Col. 2, line 50: change "...with She..." to "...with the..."

Signed and Sealed this

Twenty-second Day of September, 1998

Attest:

BRUCE LEHMAN

Attesting Officer     Commissioner of Patents and Trademarks